Figure 4:
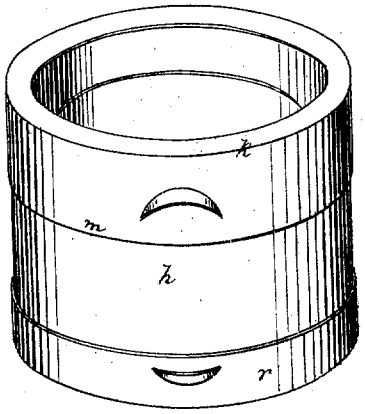

2 Sheets—Sheet 1.

S. WILSON.

CHEESE-HOOP.

No. 7,232.

Reissued July 18, 1876.

Witnesses:
E. Wolff
Jacob Felbel

Inventor:
Samuel Wilson
By attorney
J. N. McIntire

N. PETERS, PHOTO-LITHOGRAPHER, WASHINGTON, D. C.

S. WILSON.

CHEESE-HOOP.

No. 7,232.

Reissued July 18, 1876.

Witnesses.
E. Wolff.
Jacob Felbel

Inventor:
Samuel Wilson.
By his attorney
J. N. McIntire.

N. PETERS, PHOTO-LITHOGRAPHER, WASHINGTON, D. C.

UNITED STATES PATENT OFFICE.

SAMUEL WILSON, OF WATERTOWN, NEW YORK.

IMPROVEMENT IN CHEESE-HOOPS.

Specification forming part of Letters Patent No. 107,315, dated September 13, 1870; reissue No. 7,232, dated July 18, 1876; application filed June 3, 1876.

*To all whom it may concern:*

Be it known that I, SAMUEL WILSON, of Watertown, county of Jefferson, and State of New York, have invented a new and Improved Hoop for Pressing Cheese; and I do hereby declare that the following is a full and exact description thereof, reference being had to the accompanying drawings, and to the letters of reference marked thereon, making a part of this specification.

Previous to my invention various forms and constructions of cheese-hoops, or contrivances into which to press the curd properly into cheese, have been devised and employed; but in all of them are to be found some objectionable feature, either as to their capacity to effect the proper molding of the cheese, their complexity of construction, or the trouble and inconvenience involved in their practical use.

Among the essential features of a practically-successful contrivance for the molding of the cheese I believe the following characteristics to be the most important and indispensable, viz., combined simplicity of construction, strength, and lightness; provision for the use, within the hoop, of a bandage in lieu of a press-cloth, and facilities for the ready adjustment and retention in place of the bandage within which the curd is molded; capacity to effect the molding of the cheese in perfect form without uneven strain on the follower and press, and without the formation of any fin or rim on the upper edge or corner of the molded mass; means for the ready escape of the whey at the bottom of the hoop, and provision for the removal of the bottom of the hoop or vessel within which the cheese is molded; and a capacity of distension or expansion of the body of the hoop or vessel, to permit the easy removal of the molded mass from the cheese-hoop without any liability of damage to the freshly-molded mass.

My invention has for its object to afford for use a cheese-hoop or contrivance embracing in an eminent degree all the desirable features alluded to; and to this end and object my invention consists, first, in a telescopic cheese-hoop, or a cylindrical receptacle, so constructed that one part of the cylinder may slide upon or within the other, whereby, while the filling in of the curd may be conveniently done, the use of a follower, to enter within the hoop, is rendered unnecessary, as will be presently more fully explained; second, in a cheese-hoop in which the upper, movable, or sliding part is formed or provided with an inwardly-projecting flange or top rim in such a manner that while the hoop is practically open at the top it is so closed over for a short distance from its upper perimeter toward the center as to avoid the possibility of any fin or rim at the upper edge of the cheese, such as is usually made by the curd being forced out through the joint between the side of the hoop and the adjacent surface of the follower; third, in the combination, with bottom and top holder-rims or retaining-bands, of a split cylinder or distensible or expansible hoop-body, whereby, while a closed cylinder is afforded for the reception and molding of the curd, the ready releasement of the cheese is made possible by the separation from the holder-rims of the hoop-body, and the automatic distension of the latter to a circumference greater than that of the molded mass; fourth, in the employment of a removable bottom, which is also perforated suitably to permit the escape of the whey during the compression of the curd within the hoop; fifth, in the use, in combination with a bandage in which the cheese is molded, of a split cylinder or spring-hoop or band, adapted to be contracted for the easy placement over or around one end of it of one end of the bandage, and capable of then expanding to distend and hold fast the bandage so placed over or around it, all as will be hereinafter more fully described.

To enable those skilled in the art to make and use my invention, I will proceed to more fully explain the construction and operation of a cheese-hoop embracing the several features thereof, by reference to the accompanying drawings, in which—

Figure 1:
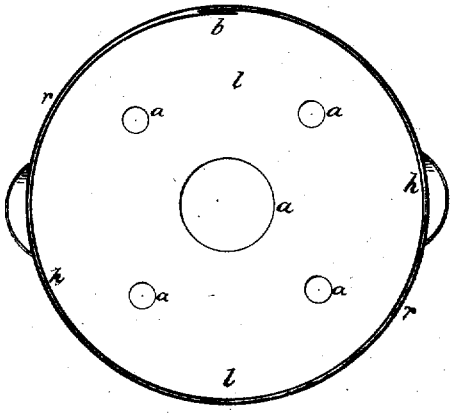
Figure 2:
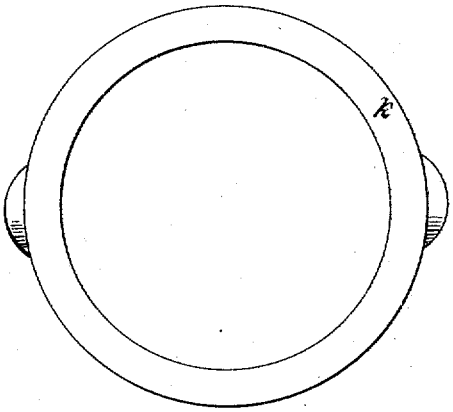
Figure 3:
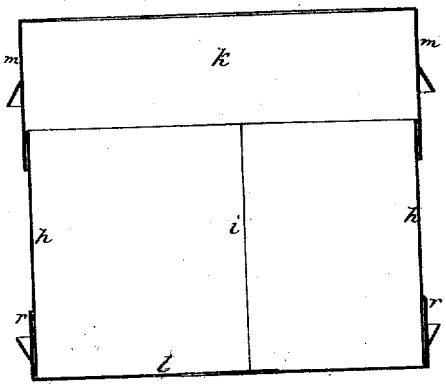
Figure 7:
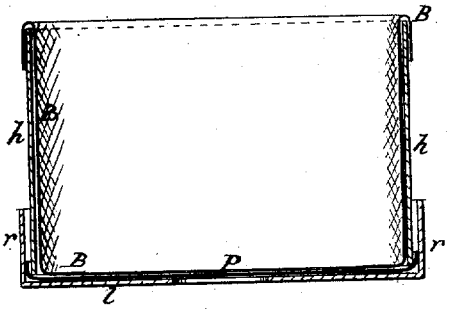

Figure 1 is a top view of the split cylinder or hoop-body, and removable perforated bottom, illustrating how these parts are to be put together. Fig. 2 is a top view of the upper sliding hoop device. Fig. 3 is a vertical section of the hoop complete, or all the parts put together, and Fig. 4 is a view, in isometrical perspective, of the hoops put together.

In the several figures the same parts will be found designated by the same letters of reference.

The lower holder-band and bottom part of the apparatus is composed of a perforated disk, *l*, having a circular rim or upwardly-projecting flange, *r*, and the body or main portion of the hoop is composed of a band or strip of sheet metal formed into almost cylindrical shape, so that when compressed or contracted to make its ends overlap, as seen at *b*, Fig. 1, its lower edge may be readily inserted within the rim or flange *r* of the perforated bottom, (as seen at Fig. 1,) and so that, after its insertion thus within the rim *r* of said bottom, it will expand or distend until its ends just about meet, and will just fill the cylindrical flange *r*.

The upper portion or top cover is composed of a rim or cylinder, *m*, of greater depth than the rim *r*, and is formed or provided with a narrow horizontal flange portion, *k*, so that when placed over the top edge of hoop *h* and around said hoop, as shown at Figs. 3 and 4, the cheese-hoop will be practically open at the top for the ready filling in of the curd.

I will now explain the operation of my improved cheese-hoop in the manufacture of the cheese, and to give an intelligible description of the manner of using or working the contrivance, will make reference to illustrative views on Sheet 2 of the drawings, and which are marked, respectively, Figs. 5, 6, 7, and 8. In these figures I have drawn precisely the same parts or devices shown at Figs. 1, 2, 3 and 4, but have made such parts to represent in section the metal parts, and have shown the manner of arranging or applying the bandage, and the head-cloths described.

Figure 5:
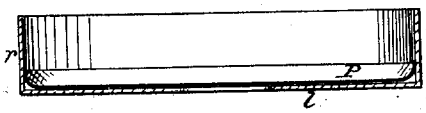

The perforated bottom *l r* is placed on the press-board, with its rim *r* projecting upward, and the lower head-cloth P is properly laid in and adjusted over the disk-like portion *l* of said perforated bottom, as seen in Fig. 5. The body-hoop *h* is then placed in the said perforated bottom by springing together the said hoop *h* until its ends overlap, as seen at *b*, Fig. 1 of the drawing, and with its lower edge on top of the head-cloth P, as illustrated at Fig. 6.

Figure 6:
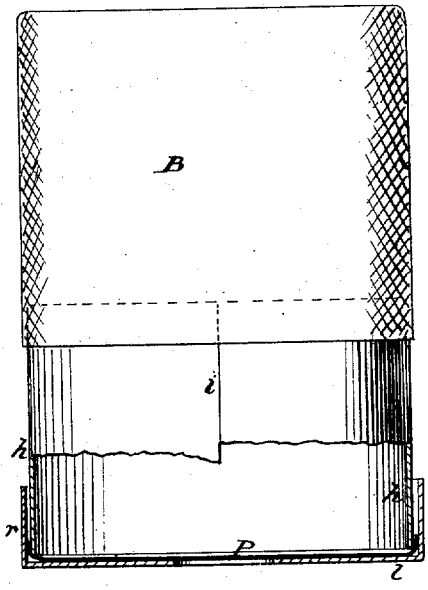

By contracting or springing together the upper end of the split cylinder or hoop *h* the bandage-cloth B may now be conveniently slipped or adjusted upon the upper end of said hoop *h*, as shown at said Fig. 6. The bandage B is then tucked in, or pushed down inside of, the cylinder *h*, and is adjusted in place at the lower end, all as clearly illustrated at Fig. 7, when the curd is filled into the bandage and hoop.

Figure 8:
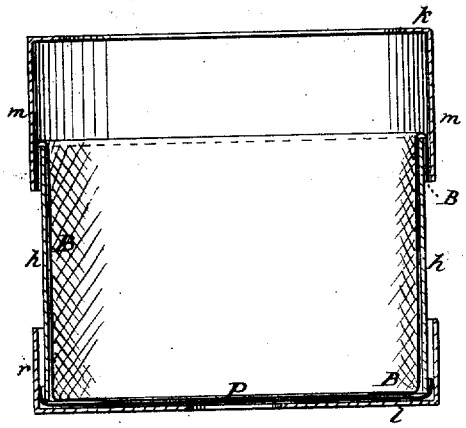

The top hoop or sliding top rim *m* is then put down over and around the top edge of hoop *h*, and top edge of bandage B, as shown in Fig. 8, and the further filling of the hoop with the curd performed.

The usual "top head-cloth" is now laid over the top of the curd, and covered by a board, upon which the press operates to effect the compression of the contents of the hoop. The board cover or platen of the press forces down the sliding top rim or hoop *m k* until the mass of curd shall have become sufficiently compressed and molded into a cheese, the expressed whey being forced out through the meshes of the head cloth P, and escaping through the perforations *a a*, &c., of the movable bottom of the apparatus. After pressing for the usual and proper time the upper portion *m k* is removed, the upper end of the bandage B is brought up to its place over the top of the cheese, and the usual additional pressing is performed, to press the upper turned-over edge of the bandage in place, and finish the molded mass.

By removing both the covers, or both the upper rim *m* and the bottom piece *r*, the split cylinder or spring-band *h* will automatically expand, thus permitting or effecting the easy disengagement of the hoop from the molded mass, which may be then treated and disposed of as usual in the manufacture of cheese.

It will be seen that, by making the hoop in parts, with the upper part arranged to slide telescopically on the other part, as described, not only may the bandage be properly held in place at the top, and the curd be readily filled in to a sufficient extent, but the insertion of any follower within the hoop is rendered unnecessary, and the objectionable liability of such inserted follower to press the cheese unevenly or out of shape, and all uneven strain on the press, are avoided. As the pressing down of the curd progresses the top part *m* follows down, and the bearing of the cylindrical portions (one within the other) increases with the movement, so as to insure a perfectly true movement of the follower, and perfect shape to the cheese.

By reason of the presence of the narrow flange *k* of the sheet-metal top hoop or cover, the usual tendency of the curd to squeeze through the joint between the hoop and "follower" is overcome, and the formation of any fin or ridge at the upper edge of the molded mass avoided. The cheese will be molded with both its upper and lower edges perfect.

It will be understood that by the formation of a cheese-hoop, with an expansible body portion *h*, and top and bottom retaining and removable portions, as described, all trouble in and possibility of fracture of the molded cheese by the removal of the molded mass from the hoop in which it was compressed is effectually avoided, since upon the removal of the top and bottom parts of the hoop the body portion *h* will automatically expand or distend, so as to effect the disengagement of the cheese from the hoop.

By the use of a bottom that is both removable and perforated the contrivance is rendered capable of permitting the escape freely from the bottom of the curd of the expressed whey, while, at the same time, the "head-cloth" P may be more readily removed than from a hoop having a fixed bottom, and the whole thing is made more desirable for use.

A great advantage is gained by the employment of a split cylinder or hoop where the operation of molding the cheese in bandage is practiced; since by the use of some such device the cloth bandage is most conveniently held open at the upper end, and retained in place during the filling in of the curd and pressing of the cheese.

Having now so fully described my invention and its operation in the manufacture of cheese that any one skilled in the art can make and use the same, what I claim as new, and desire to secure by Letters Patent, is—

1. A cheese-hoop composed of two or more tubular parts, arranged to slide telescopically, substantially as and for the purposes described.

2. The sliding or movable top tube or portion, formed or provided with a narrow inwardly-projecting flange at its top edge, substantially as and for the purposes described.

3. The combination, with top and bottom covers or holder-rims, of a split body-hoop, *h*, substantially in the manner and for the purposes set forth.

4. In combination with the body or main portion of a cheese-hoop, a removable and perforated bottom, as and for the purposes set forth.

5. The expansible tube or cylinder, in combination with a bandage, substantially in the manner set forth, whereby the adjustment and retention of the bandage within the hoop in which it is placed are readily effected, as described.

In testimony whereof I have hereunto set my hand and seal this 26th day of May, 1876.

SAMUEL WILSON. [L. S.]

In presence of—

ANDREW J. MOORE,

N. WHITING.